US008871662B2

(12) United States Patent
Lecomte et al.

(10) Patent No.: US 8,871,662 B2
(45) Date of Patent: Oct. 28, 2014

(54) COMPOSITIONS FOR MINERAL WOOL

(75) Inventors: Emmanuel Lecomte, Aulnay sous Bois (FR); Yannick Lefrere, Malakoff (FR)

(73) Assignee: Saint-Gobain Isover, Courbevoie (FR)

( * ) Notice: Subject to any disclaimer, the term of this patent is extended or adjusted under 35 U.S.C. 154(b) by 930 days.

(21) Appl. No.: 12/439,169

(22) PCT Filed: Sep. 10, 2007

(86) PCT No.: PCT/FR2007/051901
§ 371 (c)(1),
(2), (4) Date: Feb. 27, 2009

(87) PCT Pub. No.: WO2008/031979
PCT Pub. Date: Mar. 20, 2008

(65) Prior Publication Data
US 2009/0258776 A1 Oct. 15, 2009

(30) Foreign Application Priority Data
Sep. 13, 2006 (FR) ..................................... 06 53717

(51) Int. Cl.
*C03C 13/00* (2006.01)
*C03C 13/06* (2006.01)
*C03C 3/078* (2006.01)
*C03C 3/087* (2006.01)

(52) U.S. Cl.
CPC .............. *C03C 13/00* (2013.01); *C03C 2213/02* (2013.01); *C03C 13/06* (2013.01); *C03C 3/078* (2013.01); *C03C 3/087* (2013.01)
USPC ..................... 501/36; 501/35; 501/70; 501/72

(58) Field of Classification Search
CPC ........ C03C 13/00; C03C 13/06; C03C 3/087; C03C 3/078

USPC .......................................... 501/35, 36, 70, 72
See application file for complete search history.

(56) References Cited

U.S. PATENT DOCUMENTS

| 4,203,774 | A | * | 5/1980 | Battigelli et al. ................ 501/35 |
| 4,396,722 | A | * | 8/1983 | Rapp ............................... 501/35 |
| 4,615,988 | A | * | 10/1986 | Le Moigne et al. ............. 501/30 |
| 4,756,732 | A | * | 7/1988 | Barthe et al. ..................... 65/461 |
| 5,153,151 | A | * | 10/1992 | Aitken ............................. 501/45 |
| 5,672,429 | A | * | 9/1997 | Berdan II et al. .............. 428/401 |
| 5,952,254 | A | * | 9/1999 | De Meringo et al. ........... 501/36 |
| 6,054,400 | A | | 4/2000 | Brink et al. |
| 6,294,491 | B1 | * | 9/2001 | Fay et al. ......................... 501/35 |
| 6,381,989 | B1 | * | 5/2002 | Karmaker et al. .............. 65/384 |
| 6,399,525 | B2 | * | 6/2002 | Harding et al. ................. 501/35 |
| 2004/0014586 | A1 | * | 1/2004 | Otaki et al. ...................... 501/35 |
| 2005/0079970 | A1 | * | 4/2005 | Otaki et al. ...................... 501/35 |
| 2007/0298957 | A1 | | 12/2007 | Otaki et al. |
| 2009/0042030 | A1 | * | 2/2009 | Douce et al. ................... 428/392 |

FOREIGN PATENT DOCUMENTS

| EP | 0 516 354 | | 12/1992 |
| EP | 1 338 575 | | 8/2003 |
| FR | 2 335 461 | | 7/1977 |
| FR | 2883865 | A1 * | 10/2006 |
| GB | 1524408 | A * | 9/1978 |
| WO | 96 21628 | | 7/1996 |

* cited by examiner

*Primary Examiner* — Anthony J Green
*Assistant Examiner* — Elizabeth A Bolden
(74) *Attorney, Agent, or Firm* — Oblon, Spivak, McClelland, Maier & Neustadt, L.L.P.

(57) ABSTRACT

The subject of the invention is a mineral wool, the glass fibers of which have a chemical composition substantially free of boron oxide and comprising the following constituents in the limits defined below, expressed in percentages by weight: 60 to 75 $SiO_2$; 0 to 4 $Al_2O_3$; 17 to 22 $Na_2O$; 5 to 15 CaO; 0 to 2 $Fe_2O_3$; and 0 to 3 $P_2O_5$.

20 Claims, No Drawings

COMPOSITIONS FOR MINERAL WOOL

The present invention relates to the field of mineral wools that have a high dissolution rate in a physiological medium. It relates more particularly to novel glass compositions capable of forming glass wools for thermal and/or acoustic insulation or for substrates for soilless cultivation.

A mineral wool (glass wool or rock wool) is characterized by an entanglement of discontinuous fibers, which distinguishes it from continuous fibers generally intended for reinforcing organic or inorganic materials (for example cement). This particular structure, the source of the insulating properties, may be obtained by various fiberizing processes, such as internal centrifugation processes (that use centrifuges ("spinners") that rotate at high speed and that are pierced with holes) or external centrifugation processes (using solid rotors that rotate at high speed and onto the outer surface of which the molten glass is projected), or processes for attenuation by a hot gas or by a flame.

The mineral wool fibers are capable, when certain geometric criteria in terms of diameter and/or length are observed, of being introduced by inhalation into the body and especially into the lungs, sometimes all the way to the pulmonary alveoli. To prevent any pathogenic risk linked to the possible accumulation of fibers in the body, it has become necessary to make sure that the fibers have a low "biopersistence", that is to say that they can be easily and rapidly eliminated from the body. The chemical composition of the fibers is a major parameter influencing this ability to be rapidly eliminated from the body, as it plays a significant role in the dissolution rate of the fibers in a physiological medium. Mineral fibers having high dissolution rates in a physiological medium ("biosoluble" mineral fibers) have therefore been formulated and described in the prior art.

The main difficulty consists however in increasing the dissolution rate of the fibers in a physiological medium while retaining industrial feasibility, and especially a good aptitude for being fiberized, and also good working properties of the end product. Among the properties that influence the industrial feasibility are primarily the viscosity and the devitrification properties (liquidus temperature and crystallization rates). The most important usage properties are the mechanical strength (principally the Young's modulus or elastic modulus and tenacity), the high-temperature resistance and the moisture resistance or hydrolytic resistance. The latter point is particularly crucial and problematic as the two criteria of hydrolytic resistance and of biosolubility are in many respects contradictory since they both relate to the ability to dissolve in a predominantly aqueous medium.

Glass wool compositions usually contain boron oxide in contents of around 4 to 6%. This is because boron oxide is an element that is favorable to a large number of properties of mineral wools. In particular, it quite considerably increases the biosolubility of the fibers, makes it possible to improve the melting properties of the glass and the fiberizing properties via its action of reducing the high-temperature viscosity and the liquidus temperature, and also the thermal insulating properties of the mineral wools by reducing the radiative component of the thermal conductivity of the fibers.

Boron oxide is not however free of drawbacks, in particular due to the fact of its high volatility and its high cost. When the glass to be fiberized is melted in a fuel-fired furnace, the boron fly ash is such that it is necessary to provide installations for the pollution control of the flue gases. Moreover, it has turned out that in a furnace equipped with heat recovery or regenerator equipment composed of stacks of refractory ceramic parts, the boron fly ash corrodes these ceramic parts, requiring a more frequent replacement.

The object of the invention is therefore to propose novel glass compositions that may be melted in a fuel-fired furnace without requiring installations for the pollution control of the flue gases and without giving rise to a reduction in the service life of the heat recovery or regenerating equipment, said compositions nevertheless being capable of forming mineral wools that have high dissolution rates in a physiological medium and sufficient hydrolytic resistance, and also a good ability to be fiberized.

One subject of the invention is mineral wools, the glass fibers of which have a chemical composition substantially free of boron oxide and that comprises the following constituents within the limits defined below expressed as percentages by weight:

| | |
|---|---|
| $SiO_2$ | 60 to 75 |
| $Al_2O_3$ | 0 to 4 |
| $Na_2O$ | 17 to 22 |
| $CaO$ | 5 to 15 |
| $Fe_2O_3$ | 0 to 2 |
| $P_2O_5$ | 0 to 3. |

The expression "substantially free of boron oxide" in the meaning of the present invention should be understood to mean that the compositions may comprise small amounts of boron oxide as impurities. These may be, in particular, impurities introduced by certain raw materials such as fibrous wastes. Generally, the composition of the mineral wools according to the invention contains less than 0.5% boron oxide, preferably less than 0.3% and more preferably still does not contain boron oxide in amounts that can be detected by analysis techniques commonly used in the field of mineral wools.

Silica ($SiO_2$) is a glass network former oxide, and plays an essential role for its stability, both thermal and chemical. In the context of the limits defined previously, a silica percentage below 60% could result in an excessively low viscosity, an excessively high ability to devitrify (that is to say, to crystallize) during the fiberizing stage, and a reduced hydrolytic resistance. On the other hand, an excessively high content, greater than 75%, would result in an excessively high viscosity and consequently difficulties in the melting and fiberizing stages of the glasses. The silica content is also limited since this oxide has proved prejudicial to the biosolubility. The silica content is therefore advantageously greater than or equal to 62%, or 63% and even 64% and/or less than or equal to 68%, or 67% and even 66% or 65%.

Alumina ($Al_2O_3$) plays a particularly important role in the context of the present invention. As a network former element, this oxide plays an essential role in the thermal stability and mechanical strength. Considering its beneficial influence on the hydrolytic resistance and its harmful influence on the viscosity of the glass and the biosolubility, its content is preferably less than or equal to 3%, or 2.5% or even 2% or 1.5% and/or greater than or equal to 0.5%.

The sum of the silica and alumina ($SiO_2+Al_2O_3$) contents is advantageously limited to ensure a good hydrolytic resistance, a low viscosity and a high biosolubility. The sum $SiO_2+Al_2O_3$ is therefore preferably less than or equal to 70%, or 69% and even 68% or 67%, or else 66%.

Alkali metal oxides, and in particular sodium oxide ($Na_2O$) play a role in modifying the glass network, that is to say that they are inserted into the glass structure by breaking certain covalent bonds made between the network former elements.

Like alumina, they have many effects in the present invention. Sodium oxide has a role as a viscosity reducer and thus makes it possible to reduce the viscosity of the glass, facilitating the forming, excessively high fiberizing temperatures drastically reducing the lifetime of the fiberizing members. For this reason, the sodium oxide content should not be less than 17%, and is advantageously greater than or equal to 17.5%, or 18% or 18.5% and even 19%. However, it has a negative effect on the hydrolytic resistance, and its content should therefore be less than or equal to 22%, preferably less than or equal to 21% and even less than or equal to 20%. The glasses obtained have however a suitable hydrolytic resistance, which is particularly surprising and unexpected with respect to their high contents of alkali metal oxides, and in particular of sodium oxide. Potassium oxide may also be introduced into the composition of the mineral wools according to the invention, most of the time in the form of impurities, generally at contents less than or equal to 2%, or 1% by weight.

Alkaline-earth metal oxides, mainly CaO and MgO, also act as modifiers of the glassy network. Their presence is beneficial for the biosolubility and hydrolytic resistance properties (for the latter property, in comparison with sodium oxide). Calcium oxide (CaO) makes it possible to advantageously reduce the viscosity of the glass at high temperature and therefore to improve the melting, but high contents lead to a degradation of the devitrification resistance. The CaO content is therefore preferably greater than or equal to 6%, or 7% and even 8% or 8.5% and/or less than or equal to 13%, or 12% or even 11%. Magnesium oxide (MgO) may be added, in a content greater than or equal to 1%, or even 2%. Considering its damaging influence on the devitrification of the glass, the MgO content is preferably less than or equal to 5%, or 4% and even 3%.

The ratio R defined by the ratio of the $Na_2O$ content to the CaO content (R=$Na_2O$/CaO) is preferably greater than or equal to 2, or to 2.1 and even 2.2. This is because the inventors realized that this ratio greatly influenced the liquidus temperature by favoring or not favoring the crystallization to devitrite rather than to wollastonite. A ratio R greater than or equal to 2 thus makes it possible to obtain a glass for which the liquidus temperature is low, in particular less than 1000° C., or even less than 950° C. These glasses may thus be fiberized at low temperature, limiting the ageing of the fiberizing members and the energy cost.

Iron oxide ($Fe_2O_3$) is limited to a content less than or equal to 3%, preferably 2% and even 1% due to its negative effect on coloring the glass, on the ability of the glass to devitrify and on the biosolubility of the fibers. Iron oxide is preferably present in the form of impurities only, generally in contents less than or equal to 0.5%, or even 0.2%.

Phosphorus oxide ($P_2O_5$) may advantageously be used, in particular due to its beneficial effect on the biosolubility. Its content is however, advantageously limited to 2%, or even 1.5%. Considering its cost and its negative influence on the viscosity of the glass, the glasses according to the invention preferably do not contain phosphorus oxide, except for inevitable traces originating from raw materials.

The composition of the mineral wools according to the invention is preferably such that the quantity "$SiO_2+2Al_2O_3-2P_2O_5$" is less than or equal to 68%, these contents being in this case expressed as molar percentages. Preferably, "$SiO_2+2Al_2O_3-2P_2O_5$" is less than or equal to 66%. This is because fulfilling such a criterion makes it possible to optimize the biosolubility properties of the fibers.

Alkaline-earth metal oxides such as BaO (barium oxide), SrO (strontium oxide), and/or alkali metal oxides such as $Li_2O$ (lithium oxide) may be voluntarily included in the fibers according to the invention. In particular, strontium oxide has proved particularly advantageous in substitution for $SiO_2$, $Na_2O$ and CaO for improving both the biosolubility of the fibers and the hydrolytic resistance of the glasses. The composition of the mineral wools according to the invention therefore preferably contains at least 0.5%, or 1%, and even 2% or 3% of SrO, the SrO content preferably being limited to 2% or less, even 5% or less for cost reasons.

The fibers of the mineral wools according to the invention may also contain oxides other than those previously mentioned, in a weight content that does not generally exceed 3%, or 2% and even 1%. Among these oxides are the impurities commonly introduced by the natural or artificial raw materials (for example, recycled glass known as cullet) used in this type of industry (among the most common are $TiO_2$, MnO, etc.). Impurities such as $ZrO_2$ are also commonly introduced by the partial dissolution in the glass of chemical elements originating from the refractory materials used in the construction of the furnaces. Certain traces also originate from compounds used for refining the glass: mention will be made, in particular, of sulfur oxide $SO_3$ which is very commonly used. These various oxides, due to their low content, do not in any case play a particular functional role that can modify the way in which the fibers according to the invention respond to the stated problem.

The mineral wools according to the invention are preferably obtained by an internal centrifugation process, that is to say that uses centrifuges (spinners) that rotate at high speed and that are pierced with holes.

Considering the stresses associated with this process, it is preferable that the liquidus temperature of the glasses according to the invention, which sets the lower temperature limit at which it is possible to fiberize the glass, be less than 1150° C., in particular less than 1100° C., or 1050° C. and even 1000° C. or 950° C. This is because higher temperatures would involve an unacceptable limitation of the service life of the fiberizing spinners, or even a modification of the constituent materials of said spinners. In order to obtain good quality fibers and to ensure good operation of the installations, the forming margin, that is to say the difference between the temperature at which the viscosity of the glass is 1000 poise and the liquidus temperature is preferably greater than or equal to 0, and advantageously greater than or equal to 10° C., in particular 25° C., or 50° C. and even 100° C.

The glass wools according to the invention preferably have dissolution values DGG (measure of hydrolytic resistance) of less than or equal to 50 mg/g, in particular less than or equal to 45 mg/g, or 40 mg/g and even 35 mg/g or 30 mg/g. Obtaining such low values is particularly surprising considering the high $Na_2O$ content.

Another subject of the invention are thermal and/or acoustic insulation products comprising the mineral wools according to the invention.

An additional subject of the invention is a process for manufacturing mineral wools according to the invention, a process of the "internal centrifugation" type, that is to say that uses centrifuges that rotate at high speed and that are pierced with holes, the fibers obtained then being drawn by a gas jet.

A final subject of the invention is the use of the mineral wools according to the invention as thermal and/or acoustic insulation materials or substrates for soilless cultivation.

The advantages presented by the mineral wools according to the invention will be better appreciated through the following examples that illustrate the present invention without however limiting it.

Tables 1 and 2 collate glass compositions according to the invention and also the properties thereof. The comparative example C1 is a glass containing boron oxide that is representative of the glass wool compositions used industrially.

The composition of the glasses is expressed as percentages by weight of oxides. The inevitable impurities originating from the raw materials, from refining agents or from refractory materials of the furnace, some of which are not moreover analyzed, have only been transcribed in their total content. It is clearly obvious to a person skilled in the art that these impurities, present in contents generally of less than 1% or even 0.5% in the following examples do not play any functional role within the context of the present invention.

In order to illustrate the advantages of the glass compositions according to the invention, the tables present the following fundamental properties:
- the temperature corresponding to a viscosity of $10^3$ poise, denoted by "Tlog3" and expressed in degrees Celsius, corresponding to the fiberizing temperature;
- the liquidus temperature, denoted by "Tliq" and expressed in degrees Celsius;
- the dissolution value "DGG", denoted by "DGG": according to this method a glass powder having a particle size of 360 to 400 microns is immersed in water heated under reflux for 5 hours. After rapid cooling, the mixture is filtered and the solids contained in the filtrate are measured. The dissolution value "DGG" expresses the amount of dissolved material expressed in milligrams per 10 grams of treated glass;
- the dissolution rate ("biosolubility") in a neutral medium, denoted by "kSiO$_2$", representing the dissolution rate of fibers having a diameter of 10 microns left for 7 days in a static saline solution buffered at a pH of 7.4 carried out by direct bubbling of an N$_2$/CO$_2$ (90/10) mixture combined with the addition of NaHCO$_3$ (2.7 g/l) to the solution. The saline solution contains, in addition to the pH buffer, sodium chloride and sodium citrate in respective concentrations of 6.6 g/l and 0.15 g/l, the ratio of the surface area of glass exposed to the volume of the etching solution being 0.5 cm$^{-1}$. This dissolution rate, expressed in ng/cm$^2$·h, expresses the amount of glass dissolved per unit of fiber surface area and of time.

TABLE 1

|  | C1 | 1 | 2 | 3 | 4 | 5 | 6 | 7 |
|---|---|---|---|---|---|---|---|---|
| SiO$_2$ (%) | 65.0 | 64.6 | 65.7 | 67.7 | 66.0 | 65.7 | 64.0 | 65.7 |
| Al$_2$O$_3$ (%) | 2.0 | 1.95 | 1.0 | 2.0 | 1.3 | 0.9 | 0.2 | 2.5 |
| B$_2$O$_3$ (%) | 4.5 | | | | | | | |
| Fe$_2$O$_3$ (%) | 0.2 | | | 0.13 | 0.13 | 0.13 | 0.13 | 0.13 |
| CaO (%) | 8.0 | 10.8 | 10.8 | 8.4 | 9.6 | 7.95 | 9.15 | 7.95 |
| MgO (%) | 2.8 | 3.4 | 4.3 | 2.4 | 2.4 | 2.95 | 2.95 | 2.95 |
| Na$_2$O (%) | 16.0 | 17.8 | 17.0 | 18.8 | 20.0 | 17.8 | 19.0 | 17.8 |
| K$_2$O (%) | 0.8 | | | 0.3 | 0.3 | 0.3 | 0.3 | 0.3 |
| P$_2$O$_5$ (%) | | 1.0 | 1.0 | | | | | |
| SrO (%) | | | | | | 4.0 | 4.0 | 2.4 |
| Impurities (%) | 0.7 | 0.45 | 0.2 | 0.3 | 0.3 | 0.3 | 0.3 | 0.3 |
| Tlog3 (° C.) | 1073 | 1089 | 1097 | | | 1099 | | 1116 |
| Tliq (° C.) | 890 | 1000 | 1000 | | | 960 | | 960 |
| DGG (mg/g) | 27 | 28 | 29 | | | | | 28 |
| kSiO$_2$ (ng/cm$^2$·h) | 200 | 495 | 660 | 120 | 270 | 370 | 850 | 210 |

TABLE 2

|  | 8 | 9 | 10 | 11 | 12 | 13 | 14 | 15 |
|---|---|---|---|---|---|---|---|---|
| SiO$_2$ (%) | 64.0 | 65.9 | 64.0 | 65.0 | 68.8 | 65.7 | 64.8 | 64.8 |
| Al$_2$O$_3$ (%) | 1.3 | 2.5 | 1.3 | 2.9 | 2.3 | 2.2 | 1.0 | 1.0 |
| B$_2$O$_3$ (%) | | | | | | | | |
| Fe$_2$O$_3$ (%) | 0.13 | | | | 0.1 | 0.1 | 0.1 | |
| CaO (%) | 9.15 | 8.8 | 10.0 | 8.8 | 8.5 | 10.4 | 10.7 | 13.9 |
| MgO (%) | 2.95 | 3.4 | 3.5 | 3.4 | 2.6 | 2.5 | 3.4 | 0.1 |
| Na$_2$O (%) | 19.0 | 19.1 | 20.5 | 18.7 | 17.1 | 18.6 | 18.6 | 18.7 |
| K$_2$O (%) | 0.3 | 0.3 | 0.3 | 0.3 | 0.7 | 0.6 | 0.3 | 0.3 |
| P$_2$O$_5$ (%) | | | | 0.7 | | | 1.1 | 1.1 |
| SrO (%) | 2.9 | | | | | | | |
| Impurities (%) | 0.3 | 0.1 | 0.3 | 0.2 | | | 0.1 | 0.1 |
| Tlog3 (° C.) | | 1103 | 1062 | 1107 | | 960 | 980 | 970 | 1030 |
| Tliq (° C.) | | 950 | | 950 | 960 | 980 | 970 | 1030 |
| DGG (mg/g) | | 33 | | 33 | 29 | 33 | 34 | 32 |
| kSiO$_2$ (ng/cm$^2$·h) | 475 | 135 | 430 | 140 | 105 | 180 | 640 | |

The examples presented demonstrate that it is possible to obtain mineral wools, the fibers of which are free of boron oxide, and which nevertheless combine good performances in terms of hydrolytic resistance and of biosolubility. The hydrolytic resistance of the mineral wools according to the invention is in particular surprisingly low with respect to the large increase in the content of alkali metal oxides. The biosolubility is itself in general improved despite the absence of boron oxide: this point is also surprising since a large increase in the biosolubility is generally accompanied by a reduction of the hydrolytic resistance in similar proportions. It is nothing of the sort in the case of the glasses according to the invention, for which the particular choice of constituents and of their contents makes it possible to obtain an increased biosolubility for an equivalent hydrolytic resistance.

The invention claimed is:

1. A biosoluble mineral wool, the glass fibers of which have a chemical composition substantially free of boron oxide and that contain less than 0.1% by weight BaO, comprising the following constituents within the limits defined below expressed as percentages by weight:

| | |
|---|---|
| $SiO_2$ | 63 to 75 |
| $Al_2O_3$ | 0 to 4 |
| $Na_2O$ | 17 to 22 |
| CaO | 6 to 15 |
| $Fe_2O_3$ | 0 to 2 |
| $P_2O_5$ | 0 to 3, | wherein the quantity "$SiO_2+2Al_2O_3-2P_2O_5$" is less than or equal to 68% in terms of molar percentages.

2. The mineral wool as claimed in claim 1, wherein the chemical composition further comprises the following constituents within the limits defined below expressed as percentages by weight:

| | |
|---|---|
| MgO | 0 to 5 |
| SrO | 0 to 6. |

3. The mineral wool as claimed in claim 2, wherein the magnesium oxide (MgO) content is from 1% to 5%.

4. The mineral wool as claimed in claim 2, wherein the magnesium oxide (MgO) content is from 2% to 4%.

5. The mineral wool as claimed in claim 1, wherein the silica ($SiO_2$) content is from 63% to 68%.

6. The mineral wool as claimed in claim 1, wherein the alumina ($Al_2O_3$) content is from 0.5% to 3%.

7. The mineral wool as claimed in claim 1, wherein the sum of the silica and alumina ($SiO_2+Al_2O_3$) contents is less than or equal to 70%.

8. The mineral wool as claimed in claim 1, wherein the sodium oxide ($Na_2O$) content is from 17.5% to 22%.

9. The mineral wool as claimed in claim 1, wherein the calcium oxide (CaO) content is from 6% to 13%.

10. The mineral wool as claimed in claim 1, wherein the $Na_2O$/CaO ratio is greater than or equal to 2.

11. The mineral wool as claimed in claim 1, wherein the iron oxide ($Fe_2O_3$) content is less than or equal to 0.5%.

12. The mineral wools as claimed in claim 1, in the form of a thermal insulation material, an acoustic insulation material, a thermal, acoustic insulation material or a substrate for soilless cultivation.

13. The mineral wool as claimed in claim 1, wherein the silica ($SiO_2$) content is from 63% to 67%.

14. The mineral wool as claimed in claim 1, wherein the alumina ($Al_2O_3$) content is from 0.5% to 2.5%.

15. The mineral wool as claimed in claim 1, wherein the sodium oxide ($Na_2O$) content is from 18.5% to 21%.

16. The mineral wool as claimed in claim 1, wherein the calcium oxide (CaO) content is from 8% to 12%.

17. The mineral wool as claimed in claim 1, further comprising strontium oxide.

18. The mineral wool as claimed in claim 17, wherein the strontium oxide content is from 0.5% to 6%.

19. The mineral wool as claimed in claim 1, wherein the $kSiO_2$ value is at least 370 ng/cm$^2$·h.

20. A biosoluble mineral wool, the glass fibers of which have a chemical composition which consists essentially of the following constituents within the limits defined below expressed as percentages by weight:

| | |
|---|---|
| $SiO_2$ | 63 to 75 |
| $Al_2O_3$ | 0 to 4 |
| $Na_2O$ | 17 to 22 |
| CaO | 6 to 15 |
| $Fe_2O_3$ | 0 to 2 |
| $P_2O_5$ | 0 to 3, | wherein the quantity "$SiO_2+2Al_2O_3-2P_2O_5$" is less than or equal to 68% in terms of molar percentages.

* * * * *